US00RE40898E

(19) United States
(12) Reissued Patent
Huss

(10) Patent Number: US RE40,898 E
(45) Date of Reissued Patent: Sep. 1, 2009

(54) LUBRICATING DEVICE FOR A PLURALITY OF LUBRICATING STATIONS

(75) Inventor: Rolf Huss, Lossburg (DE)

(73) Assignee: Memminger-Iro GmbH, Dornstetten (DE)

(21) Appl. No.: 10/722,165

(22) Filed: Nov. 25, 2003

Related U.S. Patent Documents

Reissue of:
(64) Patent No.: 6,322,336
Issued: Nov. 27, 2001
Appl. No.: 09/497,621
Filed: Feb. 3, 2000

(30) Foreign Application Priority Data

Feb. 5, 1999 (DE) ..... 199 04 647

(51) Int. Cl.
*F04B 39/00* (2006.01)
*F04B 39/10* (2006.01)
*F04B 7/04* (2006.01)
*F04B 23/00* (2006.01)
*F16H 55/18* (2006.01)
*F16H 27/02* (2006.01)

(52) U.S. Cl. ..... 417/442; 417/494; 417/500; 417/502; 74/127; 74/409

(58) Field of Classification Search ..... 417/442, 417/500; 74/127
See application file for complete search history.

(56) References Cited

U.S. PATENT DOCUMENTS 1,776,509 A * 9/1930 Hulshizer ..... 74/127
2,039,941 A * 5/1936 Terry ..... 121/7
3,320,892 A * 5/1967 Wolff ..... 103/2
4,412,519 A * 11/1983 Hoch et al. ..... 123/449
4,489,684 A * 12/1984 Yamada ..... 123/198 F
4,528,965 A * 7/1985 Gibson et al. ..... 123/502
4,632,648 A * 12/1986 Goyne ..... 417/502
4,674,964 A * 6/1987 Hertell ..... 418/60
4,944,367 A * 7/1990 Nelson et al. ..... 184/29
5,097,803 A * 3/1992 Galvin ..... 123/3
5,181,585 A * 1/1993 Braun et al. ..... 184/7.4
5,597,051 A * 1/1997 Moriya et al. ..... 184/6.1

FOREIGN PATENT DOCUMENTS

DE 908689 * 4/1954
DE 40 21 557 A1 * 1/1992
DE 0 499 810 B1 * 3/1995
FR 1094985 * 5/1955
GB 1502920 * 3/1978

* cited by examiner

*Primary Examiner*—Devon C Kramer
*Assistant Examiner*—Philip Stimpert
(74) *Attorney, Agent, or Firm*—Cohen Pontani Lieberman & Pavane LLP

(57) ABSTRACT

In a lubricating device for a plurality of lubricating stations, in particular for supplying lubricant to knitting machines, a pump device is provided that serves at the same time as a distributor device. To that end, the pump device has a piston which is provided with a control groove. The corresponding pump cylinder has an inlet and a plurality of outlets distributed over the cylinder wall. Depending on which of the outlets the control groove of the piston is made to coincide with, a corresponding lubricating station is selected. The pump device is thus a distributor device as well.

2 Claims, 6 Drawing Sheets

LUBRICATING DEVICE FOR A PLURALITY OF LUBRICATING STATIONS

Matter enclosed in heavy brackets [ ] appears in the original patent but forms no part of this reissue specification; matter printed in italics indicates the additions made by reissue.

FIELD OF THE INVENTION

The invention relates to a lubricating device for a plurality of lubricating stations, especially for supplying lubricant, preferably oil, to lubricating stations of a knitting machine.

BACKGROUND OF THE INVENTION

In knitting machines, for instance, the needle drive requires constant lubrication, which is equally true for the needle guide in the needle bed or needle cylinder, and so forth. Yet satisfactory, regular lubrication is extremely important, precisely in modern high-speed knitting machines. The lubricating stations must be reliably supplied with oil. As a rule, failure of the lubrication leads to increased water and early failure of the knitting machine. On the other hand, the lubrication must be done in a thrifty way. It is counterproductive to supply too much oil to the lubricating stations. Such knitting machines are therefore often equipped with so-called pressure oilers or pressure oil lubricating systems, which feed oil under pressure from a central point to the individual lubricating stations via suitable lines.

A lubricating device for this purpose, known for instance from European Patent Disclosure EP 0 499 810 B1, permits reliable, metered lubrication of a plurality of lubricating stations. The lubricating device has a lubricant container in which a piston pump is accommodated. The output of the piston pump is connected to a motor-drive distributor valve, so that the pump outlet can be connected to one lubricant line at a time, selected from a group of lubricant lines.

It is an object of the invention to create a simplified lubricating device. It is another object of the invention to create an improved method of lubrication.

These and other objects are attained in accordance with one aspect of the invention directed to a lubricating device comprising a distributor device with which lubricant furnished by a pump is diverted to selected lines and can thus be delivered to selected lubricating stations. The distributor device and the pump device are combined into one unit. Combining the distributor device and the pump device into a unit makes for a considerably simpler design of the lubricating device. The triggering of the lubricating device can be simplified as well.

The pump device is embodied as a piston pump and has a piston that is axially displaceable in a cylinder. Together with the cylinder, this piston serves as a pumping element. The cylinder and the piston are also embodied as a control element. To that end, the piston is rotatably supported in the cylinder and is provided with control faces or conduits, with which control slots or outlets disposed in the cylinder are associated. The piston can be provided on its jacket face with at least one control conduit that is embodied in such a way that by suitable rotary positioning of the piston, it can be brought into coincidence with at least one of the outlet conduits at a time. If needed, the arrangement can also be made such that the control conduit can be switched into coincidence with a plurality of outlet conduits. The control conduit and the outlet conduits are disposed such that the work chamber, defined by the piston and the cylinder, communicates with whichever outlet conduit has been selected, over the entire stroke of the piston. In this way, all the oil volume positively displaced by the piston can be pumped into the outlet conduit. The piston pump embodied in this way is both a pump device and distributor device at one and the same time.

The pump device and the distributor device can be connected to a drive device that effects the rotation and displacement of the piston. This displacement motion is a pumping motion, so that the displacement drive forms a pump drive. If no displacement motion occurs, the rotary motion of the piston causes no change in volume in the cylinder, and as a result, only the blocking or uncovering of outlet conduits is controlled by the rotary motion. Thus the rotary drive is a distributor drive, and the piston is a control slide. The pumping and switchover can thus each be effected independently, by rotating and displacing the piston. This can be done by means of separate drive devices, or by a combined drive device that is capable of generating both a rotary and a displacement motion.

For rotating the piston, a stepping motor is preferably used, which generates a desired rotary positioning motion. Rotary positions to be taken for selecting an outlet conduit and thus for activating a lubricating station are simple to attain with a stepping motor. However, the displacement motion of the piston can be derived from this stepping motor as well. To that end, the piston is preferably connected to the stepping motor or other kind of control motor via a coupling, which initially allows a set or adjustable rotary play, and the relative rotation within the rotary play is converted by a gear means into the desired linear motion.

The rotary angle of the rotary play can be utilized to generate a linear motion. To that end, the piston is preferably connected to a locking device, which keeps the piston nonrotatable in arbitrary or selected rotary positions, but without blocking its axial displacement. By way of example, this locking device can be formed by a locking wheel, which can be brought into and out of engagement with a locking member. This is preferably done by means of a suitable radial motion of the locking member, for instance by means of a pull magnet. If the piston is held in a manner fixed against relative rotation, then a rotation of the stepping motor within the context of the rotary play of the coupling device is possible. The displacement device is now preferably formed by a gear, which converts this relative rotation between the piston and the rotator device into a linear motion of the piston.

In an especially durable, simple embodiment, the locking wheel is embodied as a ratchet wheel. The locking element then acts as a pawl, which allows a rotation of the locking wheel in a selected direction. The pawl can also be releasable, for instance by a lifting magnet, to allow rotation of the locking wheel in the other direction. Such an arrangement allows normal operation of the lubricating device with only a very few actuations of the lifting magnet, used by way of example, for releasing and locking the paw. Even if simple, inexpensive lifting magnets are used, this makes a long service life possible.

The gear can be formed by two threaded elements meshing with one another. The pitch of the thread of the threaded elements is dimensioned such that by the relative rotation between the piston and the control motor, within the context of the rotary play of the coupling device, one complete piston stroke is executed. The piston can be moved back and forth by rotating the control motor forward and in reverse.

As needed, still other devices can serve as the gear means. For instance, it may be expedient to provide a cam drive, which enables a reciprocating motion of the piston upon rotation of the rotary drive in a single specified direction. Such a cam drive can be formed by an undulating annular groove provided in the wall of a bush, in which groove a radially extending pin or prong runs, driven by the control motor.

The gear that generates the linear motion is preferably prestressed. This can for instance be accomplished by means of a magnet that keeps flanks of the gear that slide past one another in contact with one another. This is advantageous particularly with a view to correct metering of the lubricant. If the drive reverses its rotary direction, for instance to change from a forward piston stroke to a reverse piston stroke, then the turning points are precisely defined, and incorrect metering is avoided.

The outlet conduits leading out of the cylinder and one inlet conduit are each preferably provided with check valves. The pump device thus makes do without further control means. The check valves are preferably automatic valves, controlled by the differential pressure applied. No other valve control arrangements are needed.

For monitoring proper operation of the lubricating device, a sensor device that detects and monitors the reciprocating motion of the piston can be advantageous. It may suffice to monitor whether the piston attains a certain stroke or not. For instance, if one lubricating conduit is stopped up, the piston is unable to pump any lubricant into this conduit and is accordingly blocked. It fails to reach the switching point of the sensor device, and the sensor device detects this and turns off the affected machine.

Another aspect of the invention is directed to a method for the lubrication of lubricating stations of a machine by means of at least one pump via lines. Lubricant is pumped discontinuously by the pump to the lubricating stations via the lines. For lubricant supply to one or more lubricating stations, the applicable line or lines are subjected by the pump to a pressure that fluctuates over time. Regardless of the specific design of the pump device and distributor devices in attached lines, and regardless of how many lubricating stations are connected, it is expedient for the pump pressure to be modulated during individual lubricating pulses. If a stepping motor is used to drive the pump, its individual steps can be converted into micropumping pulses, whose train forms a lubricating pulse. The intervals between individual micropumping pulses are expediently dimensioned such that the pressure in the lines does not drop below a minimum limit value. The minimum pressure is preferably somewhat less than the requisite injection pressure for the connected nozzles. It suffices to keep any resilience (elasticity) of the lines under initial stress. This makes it possible either to meter especially small quantities of lubricant, or to prolong the lubricating process.

DETAILED DESCRIPTION OF THE PREFERRED EMBODIMENTS

Figure 1:
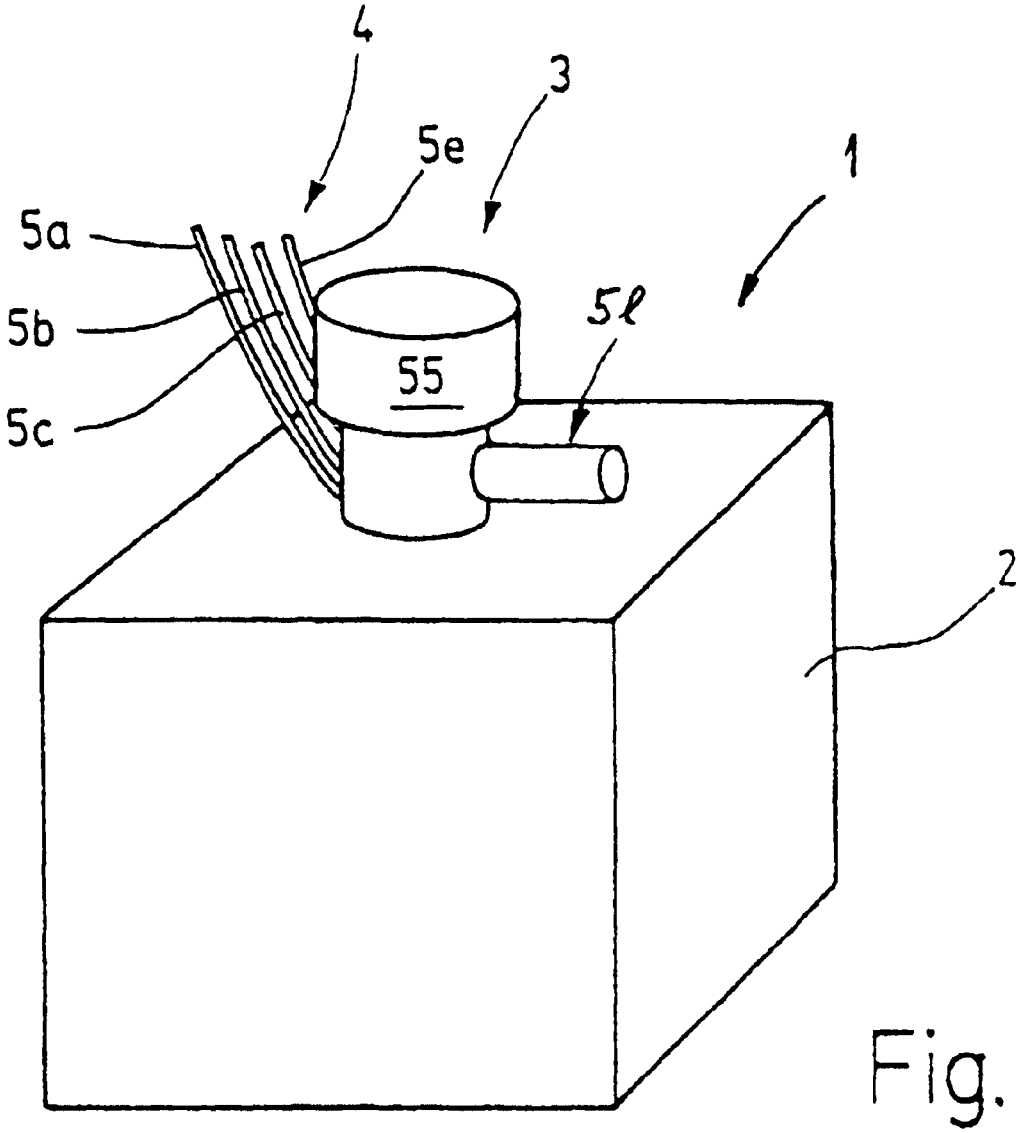
FIG. 1 shows the lubricating device in a schematic perspective view.

In FIG. 1, a lubricating device 1 is shown, which includes a supply container 2, for lubricant, such as oil. A distributor and pump unit 3 is inserted into the supply container 2 and dispenses predetermined portions of lubricant at predetermined times to a group 4 of lubricant lines 5a through 5e that lead away from it.

Figure 2:
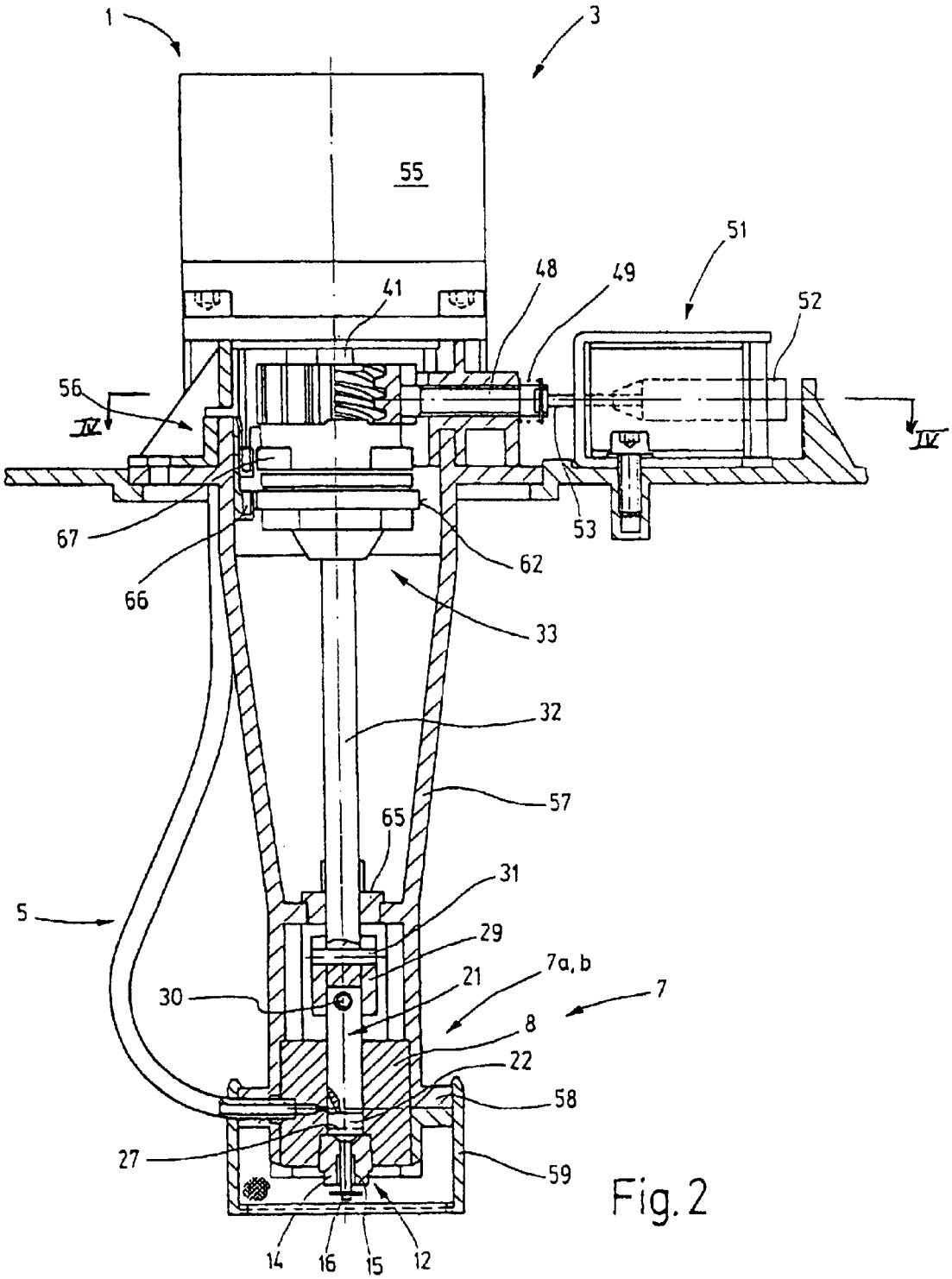
FIG. 2 shows the lubricating device of FIG. 1, in a sectional view of a detail and on a different scale.

The pump and distributor unit 3 schematically shown in FIG. 1 is shown separately in FIG. 2. A piston pump 7, which is both a pump device 7a and a distributor device 7b simultaneously is used for pumping and allocating the lubricant. The piston pump 7, as seen particularly from FIGS. 3 and 7, includes a cylinder body 8 with a cylindrical through bore 9. The through bore 9 is embodied on its lower end in terms of FIGS. 2 and 7 as a stepped bore, because it has one portion 10 of increased diameter. This portion serves to receive a check valve 12, whose valve body 14 is screwed for instance into a corresponding thread in the portion 10.

The valve body 14 is provided with a through conduit 15 for receiving a valve closure member 16. The head of the valve closure member 16 points toward the inner chamber, defined by the through bore 9, of the cylinder body 8. If needed, a spring, not shown, can brace the valve closure member against a valve seat embodied on the valve body 14.

Figure 3:
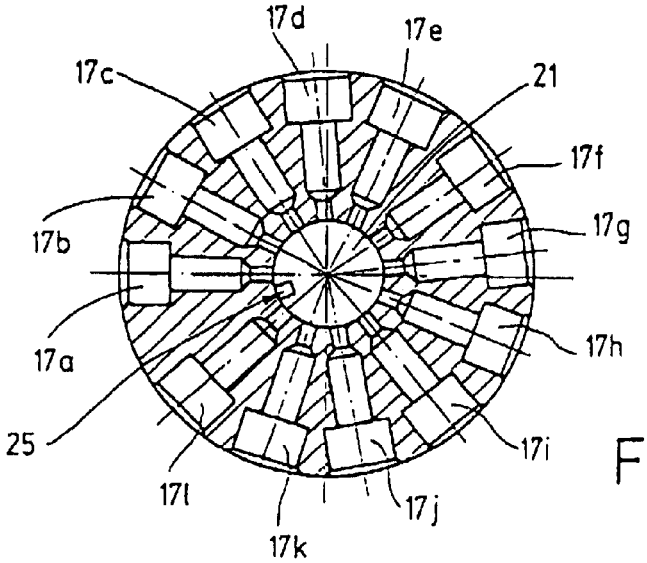
FIG. 3 is a horizontal section taken at line III—III of the cylinder body 8 of FIG. 7, but with piston 21 assembled thereinto.

The [valve] *cylinder* body [14] *8* is provided with a plurality of radial bores 17, in the present example 12 of them (17a-17l; FIG. 3), which are all disposed in the same plane 18 to which the through bore 9 is perpendicular. [The radial bores 17a-17l FIG. 3), which are disposed in the same plane 18 to which the through bore 9 is perpendicular.] The radial bores 17a-17l are disposed at equal angular spacings from one another, while the spacing between the radial bore 17l and the radial bore 17a is somewhat greater than the otherwise uniform spacings among the radial bores 17a through 17l. Check valves, not identified by reference numeral, are inserted into the radial bores 17 (the reference numeral without a letter following it stands equally for all the radial bores 17a through 17l), and these check valves allow a fluid flow in the radial direction outward, that is, from the bore 9 outward through the outlet conduit formed by the respective radial bore 17, but not back again.

The lubricant lines 5a through 5e are connected to the outlet valves and lead to the lubricating stations. The check valves can be provided as needed also on an end of the respective line 5a through 5e remote from the distributor device 7b, in which case only connection nipples are screwed into the radial bores 17.

A piston 21 is inserted into the through bore 9, and its outer diameter substantially matches the inside diameter of the through bore 9, so that while the piston is seated axially displaceably and rotatably in the through bore 9, it also together with the through bore defines a work chamber 22 relatively tightly (FIG. 2). Along with its cylindrical jacket face 23, the piston 21 also has a substantially plane end face 24. A control groove 25 extends over the jacket face, beginning at the end face 24, parallel to the center axis 26 of the piston. The length of the control groove 25 is preferably equal to or somewhat greater than the spacing of the plane 18 from a "top" dead center 27 of the piston; this point is represented by a dashed line in FIG. 2.

The piston 21 reaches top dead center 27 with its end face 24 when the work chamber 23 is smallest, or in other words, in terms of FIG. 2, when the piston 21 is in its bottommost position.

The control groove 25, as FIG. 3 shows, is relatively narrow and extends in the circumferential direction along the jacket face 23 over a circumferential region that is approximately equivalent to the diameter of the radial bores 17 at the wall of the through bore 9. The depth of the control groove 25 is dimensioned such that the flow resistance in the control groove 25 is not substantially greater than in the radial bores 17.

On its end protruding out of the cylinder element 8, the piston 21 is mounted in a connection cuff 29 and pinned to it (pin 30). The connection cuff 29 is also connected via a further pin 31 to an actuating rod 32 that leads to a drive device 33. The actuating rod 32 is connected in a manner fixed against relative rotation and solidly in the axial direction to a coupling half 34, which has two ribs 35 and 36 extending axially and disposed parallel to and spaced apart from one another. Between these ribs, windows 37, 38 are formed, which can be seen particularly in FIG. 6.

The coupling half 34 belongs to a coupling device 39, whose other coupling half 40 is formed by a radial pin 42 driven by a shaft 41. This pin with both ends engages the windows 37, 38, and after each execution of a certain rotary play, here defined at 90°, it can come into contact with one flank of each of the ribs 35, 36.

Figure 7:
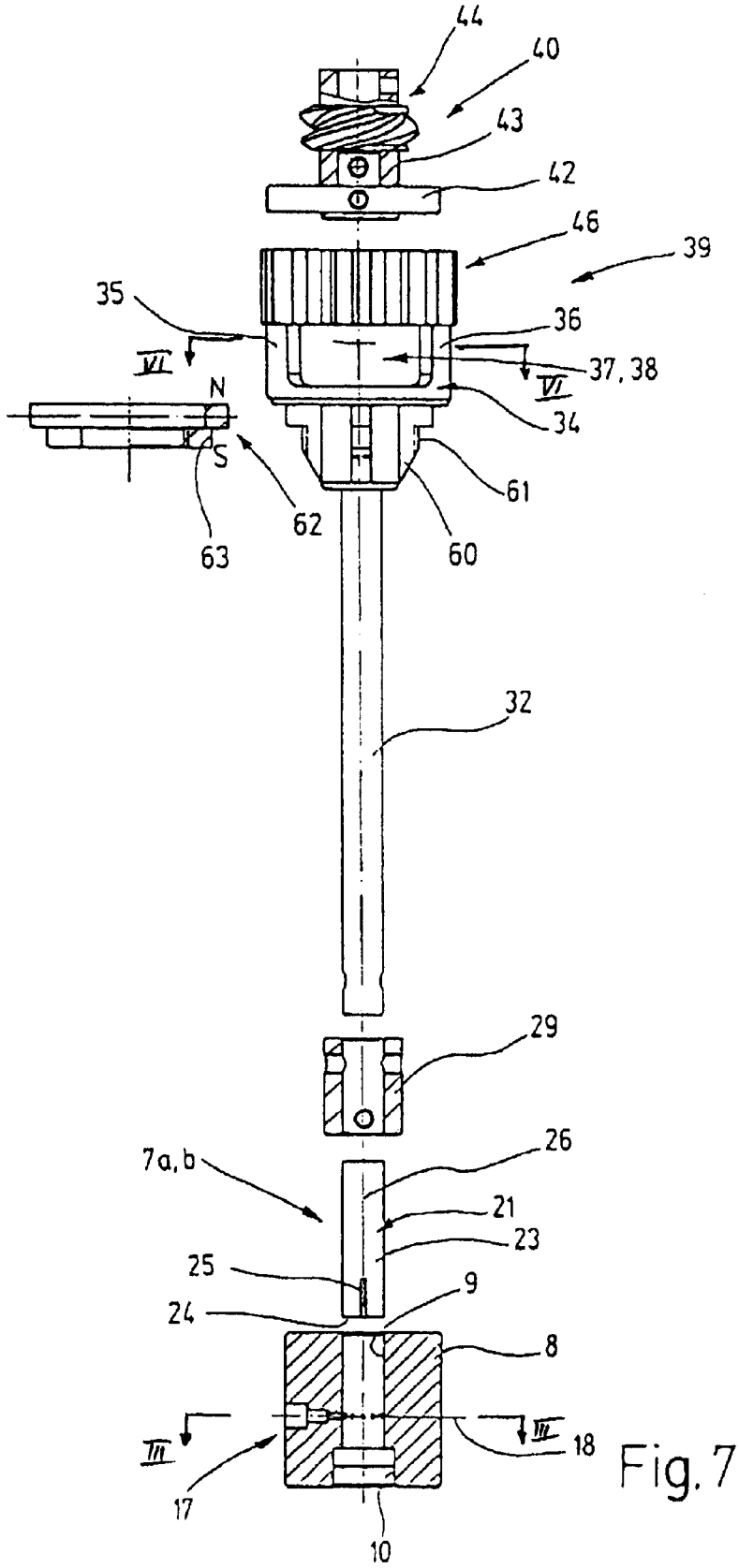
FIG. 7 shows a pump device, belonging to the lubricating device of FIG. 2, with an associated coupling device, an associated locking wheel, and a threaded element for generating a linear motion.

The shaft 41 also has a bush 43, which can be seen from FIG. 7 and establishes the connection to the radial pin 42 and is provided on its outside with a threaded element 44. This threaded element has a male thread with multiple turns. Its pitch is dimensioned such that over 90° of the circumference of the threaded element 44, a distance is traversed in the axial direction that corresponds to the complete piston stroke of the piston 21.

Figure 5:
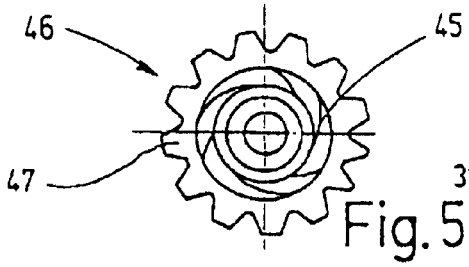
FIG. 5 is a plan view of a locking wheel belonging to the drive device of FIG. 4.

During operation, the threaded element 44 is in communication with a threaded element 45, which is seen in FIG. 5 and is embodied in an annular element or portion that is supported by the ribs 35, 36 of the coupling half 34. Thus when the rotary play of the coupling 39 is executed, the coupling half 34 changes its axial position relative to the coupling half 40.

The portion of the coupling half 34 provided with the female thread (threaded element 45) is embodied, on its outside, as a locking wheel 46. This locking wheel has axially extending teeth 47 of approximately trapezoidal cross section, which serve to lock the coupling half 34 in a manner fixed against relative rotation but axially displaceably. This can be seen from FIG. 4. A locking bar 48 is displaceably supported radially to the locking wheel 46. The locking bar 48 is prestressed by a compression spring 49 toward its radially outer position, in which it is not in engagement with the locking wheel 46. A lifting magnet 51 serves with its armature 52, via a corresponding rod 53, to put the locking bar 48 into engagement with the locking wheel 46, so that the rotation of the locking wheel is blocked in discrete positions specified by the teeth 47. These blocking or locking positions each correspond to rotary positions in which the control groove 25 (FIG. 3) is aligned with one of the radial bores 17. Accordingly, 13 interstices between teeth are present, 12 of which correspond to the positions of the radial bores 17, and the 13th of which corresponds to the larger interstice between the radial bores 17l and 17a. The size of the interstices between teeth corresponds to the size of the spacings of the radial bores 17.

The coupling half 40 is connected in a manner fixed against relative rotation to the shaft 41, which forms the power takeoff shaft of a stepping motor 55. This motor is oriented coaxially to the actuating rod 32 and is supported by a corresponding mount 56. The mount 56, which is embodied in multiple parts, also carries the lifting magnet 51 and has a tubular, tapering extension 57, which is disposed coaxially to the actuating rod 32 and carries the pump unit 7 on its lower free end. There, it has a flange-like extension 58, on which the lubricant lines 5 can be retained and which moreover has a microporous sieve 58. This sieve is embodied in cup-like shape and encloses the lower end of the extension 57. The lubricant flowing to the inlet valve 12 must accordingly pass through the microporous sieve 59 and is thus filtered.

On its side toward the actuating rod 32, the coupling half 34 is provided with a hub 60, which has a male thread 61. On the hub 60, an annular, axially polarized permanent magnet 62, shown separately in FIG. 7, is retained with the aid of a nut 63, for which nut the male thread 61 is intended. By means of its magnetic field, the permanent magnet 62 generates a force that keeps the threaded element 44 in engagement with the thread 45 without play. This serves to prevent an undesired idle motion in the gear at the reversal of the rotary direction of the stepping motor 55; the gear is formed by the threaded element 44 and the female thread 45 and serves to convert a rotary motion into a linear motion.

The actuating rod 32 is supported on the extension 57 in a bush 65, which is disposed adjacent the connecting cuff 29 in a corresponding partition of the extension 57. The bush 65 allows both a rotary and an axial motion of the actuating rod 32.

Figure 4:
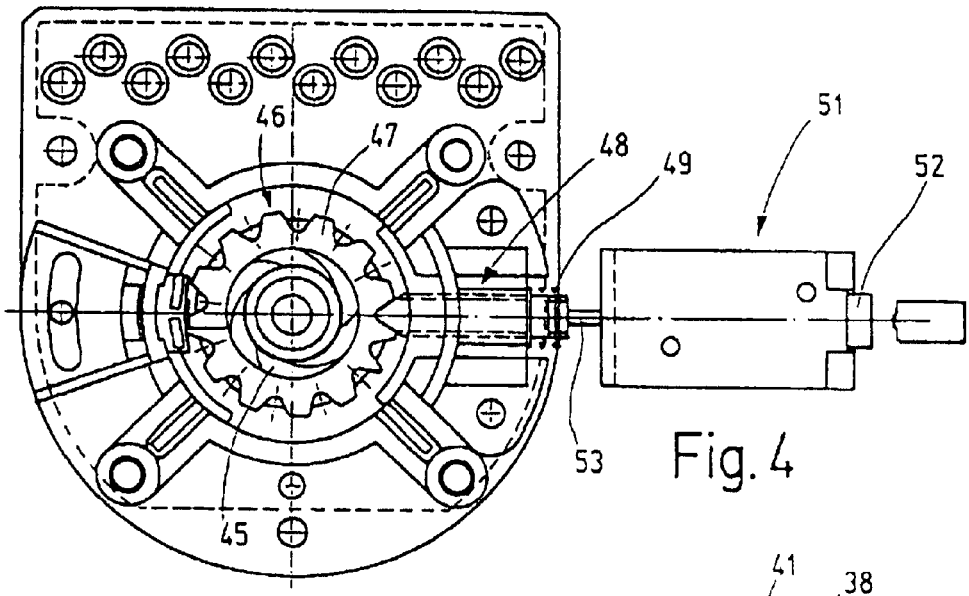
FIG. 4 is a horizontal section taken at line IV—IV of the lubricating device of FIG. 2.
Figure 6:
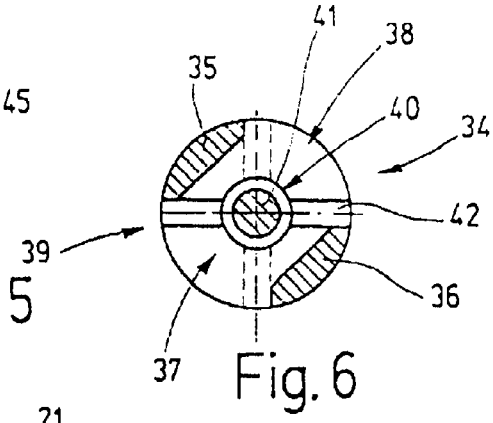
FIG. 6 is a horizontal section through coupling device 39, taken at line VI—VI in FIG. 7, but with pin 42 assembled thereinto.

For monitoring the motion of the piston 21, a magnetic sensor, for instance a Hall sensor 66, is disposed on the inside of the extension 57, adjacent to the permanent magnet 62; it detects the position of the permanent magnet 62 and distinguishes between at least overshooting and undershooting a switching position. If needed, a further Hall sensor or other kind of position sensor 67 may be provided in the vicinity of the transverse pin 42, in order to detect the position of this pin. Both the Hall sensors as well as the stepping motor 55 and the lifting magnet 51 are all connected to a control device, which controls the lubricating device 1 as follows:

For describing proper operation, it will be assumed that the piston 21 is initially in the position shown in FIG. 3, and the locking bar 48, as a consequence of triggering of the pull magnet 51, is in engagement with the locking wheel 46 (FIG. 4). If the thread of the threaded element 44 is a right-handed thread, then the stepping motor 55, at least if the transverse pin 42 is not yet in the position represented by heavy lines in FIG. 6, is now rotated in such a way that the transverse pin 42 is pivoted clockwise. For example, it is moved out of the position shown in dashed lines in FIG. 6 to the position shown in heavy lines. On traversing this course, the axially fixed element 44 lifts the coupling half 34 in the axial direction in such a way that the piston 21 executes one complete intake motion. The work chamber 22 becomes larger, and lubricant, such as oil, flows into the work chamber 22 via the inlet valve 12.

The locking wheel 46 is held in a manner fixed against relative rotation. At the latest when the transverse pin 42 runs up against the ribs 35, 36, the stepping motor 55 stops. The pull magnet 51 is now deexcited, and as a result the locking wheel 46 is released. The stepping motor 55, which until now has served to impart a reciprocating motion to the piston 21, now positions the now freely rotatable locking wheel 46 onward by one tooth. In the process, the transverse pin 42 carries the ribs 35, 36 and thus the coupling half 34 along with it. The control groove 25 is thereby moved into coincidence with the radial bore 17a. Once this position is reached, the pull magnet 51 is triggered again and as a result presses the locking bar 48 into the corresponding interstice between teeth of the locking wheel 46. As a result, this locking wheel is once again retained in a manner fixed against relative rotation.

For dispensing a desired portion of lubricant to the lubricant line 5a, the stepping motor 55 is now triggered counter clockwise. Because of the size of the windows 37, 38, the rotary motion is limited here to a one-quarter rotation. If the stepping motor 55 traverses this course, this rotary motion is converted, by interaction of the threaded element 44 with the female thread 45, into an axial motion of the coupling half 34 that is oriented downward, in terms of FIG. 2. Via the actuating rod 32, the piston 21 is moved, without rotating, downward in the direction of its top dead center 27. The positively displaced oil is correspondingly dispensed at the lubricant line 5a. There is no need for the entire course available to be traversed. The stepping motor 55 can also be stopped before it has executed a one-quarter rotation. A lesser quantity of oil is then correspondingly dispensed. As a result, fine metering of the oil portions to be dispensed is attainable.

Once the downward motion of the piston 21 has ended, the stepping motor 55 is actuated clockwise again, until the traverse pin 42 again meets the ribs 35, 36. The pull magnet 51 is now released, and as a result the compression spring 49 moves the locking bar 48 radially outward and releases the locking wheel 46. The stepping motor can now rotate onward by one tooth (or as needed a plurality of teeth), carrying the coupling half 34 and thus the piston 21 by rotation along with it, in order to approach the next lubricating position. For instance, the control groove 25 is now made to coincide with the radial bore 17b. The process described in conjunction with the radial bore 17a now begins over again. As described, all the radial bores 17 can thus be approached in succession, and thus all the lubricant lines 5 can be supplied separately with suitable portions of oil.

Figure 8:
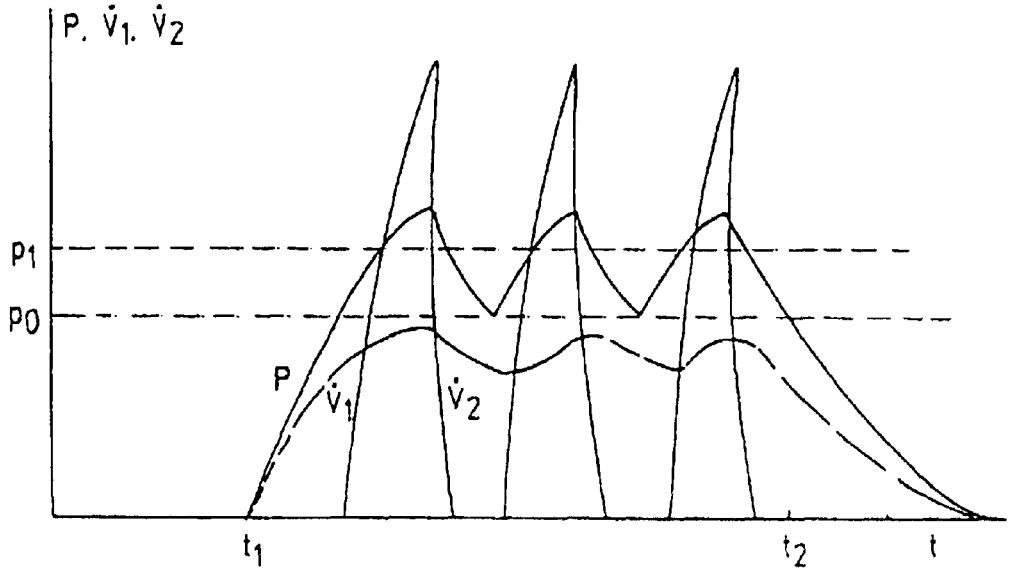
FIG. 8 is a graph showing the course over time of the injection pressure of the oil stream flowing to an injection nozzle and the oil stream output by the injection nozzle.

The dispensing of an oil portion can be done in pulsed fashion, as illustrated by FIG. 8; the injection pressure p built up by the pump device 7a is modulated within a lubricating interval $t_1$ $t_2$. To that end, the stepping motor 55 is triggered and moved incrementally, so that the piston 21 is likewise moved incrementally. In each of the brief resting periods, the pressure p can drop somewhat below a pressure limit value $p_1$. The connected nozzles begin to inject at the pressure limit value $p_1$. If the pressure meanwhile drops below this value, for instance to a somewhat lesser valve $p_0$, then the [nozzles inject intermittently. The incoming flow $V_{1*}$ to the nozzles fluctuates as a result and over time,] *oil injection through the nozzles is interrupted. As a result, the incoming flow $V_1$* to the nozzles fluctuates over time and* as a consequence of the elasticity of the lines. The nozzles inject the oil stream $V_2$* droplet by droplet in the form of micropulses, so that the oil stream between individual droplets, because of the brief pressure drops, is zero. In this way, even small oil quantities can be dispensed over a prolonged time in the injection stream, using relatively large nozzles that are not likely to become stopped up.

When the lubricating device 1 is put into operation, venting of the pump device 7a may initially be needed. To that end, the piston 21 is rotated into a venting position, in which its control groove 25 coincides with a radial bore 17l that is open to the outside and in which no check valve is disposed. One or more complete piston strokes now cause the expulsion of air and the filling of the pump volume with oil. Proper operation can then be begun.

Figure 9:
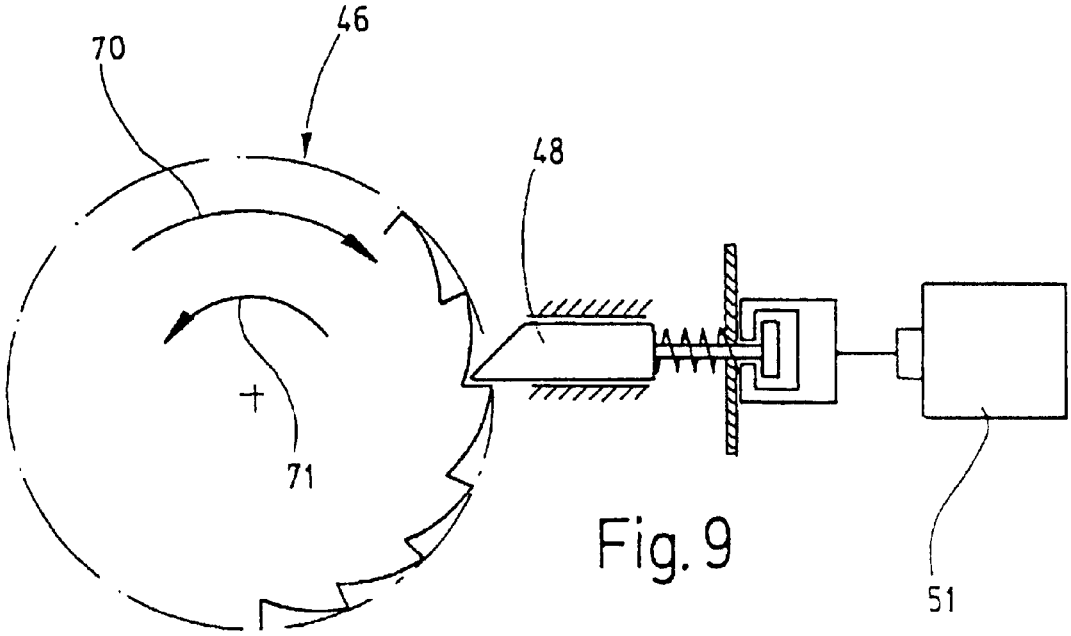
FIG. 9 is a schematic plan view of a modified embodiment of a locking device with a locking wheel embodied as a ratchet.

A modified embodiment of the locking mechanism is shown in FIG. 9. Here the locking wheel 46 is embodied as a ratchet wheel. The locking bar 48 is embodied as a pawl. This makes it unnecessary to trigger the pull magnet each time the locking wheel 46 is to be indexed onward. The locking bar 48 is spring-loaded toward the locking wheel 46. It enables a rotation of the ratchet wheel 46 in the clockwise direction (arrow 70) for rotating the piston 21 and thus actuating the distributor. In the opposite direction (arrow 71), however, any rotation is blocked, so that the pumping operation can be performed. It is now necessary to actuate the lifting magnet 51 only in a very few exceptional cases.

Figure 10:
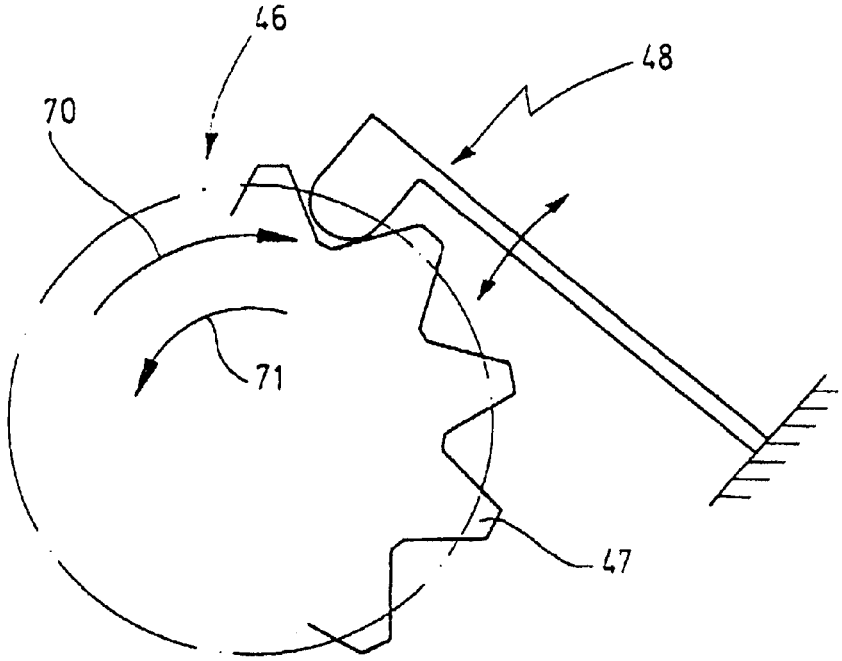
FIG. 10 is a schematic plan view of a further modified embodiment of a locking device with a locking wheel embodied as a ratchet.

A further modified embodiment is shown in FIG. 10. The toothing of the locking wheel 46 has teeth 47 with a relatively slight flank pitch. The locking bar 48 is embodied as a radially resilient pawl. The control of the rotary motion of the piston 21 in this embodiment is effected in that the stepping motor 55, once the play of the coupling device 39 has been traversed, overcomes the detent moment of the locking bar by rotating clockwise or counterclockwise.

In a lubricating device for a plurality of lubricating stations, especially for supplying lubricant to knitting machines, a pump device 7a is provided that acts at the same time as distributor device 7b. To that end, the pump and distributor unit 7 has a piston 25, which is provided with a control groove 25. The corresponding pump cylinder has one inlet and a plurality of outlets that are distributed over the cylinder wall. Depending on which of the outlets the control groove 25 of the piston 21 is made to coincide with, a corresponding lubricating station is selected. The pump device 7 is thus at the same time a distributor device.

What is claimed is:

[1. A lubricating device for a plurality of lubricating stations, in particular for supplying lubricant to a plurality of lubricating stations in a knitting machine, having a pump device (7a) for pumping lubricant, the pump device having a piston (21) supported axially displaceably in a cylinder (8), and having a distributor device (7b), by which the lubricant pumped by the piston (21) is to be distributed to one or more lines (5) of a group (4) of lines (5) leading away from the distributor device (7b), characterized in that the distributor device (7b) is part of the pump device (7a), and the piston (21) is connected to a locking device (46, 48), which serves to arrest the piston (21) in a manner fixed against relative rotation in selected rotary positions, while allowing an axial motion.]

[2. The lubricating device of claim 1, characterized in that the cylinder (8) has a plurality of outlet conduits (17), which are controllable by the piston (21).]

[3. The lubricating device of claim 1, characterized in that the cylinder (8) has a cylindrical cylinder wall, and that the outlet conduits (17) are disposed penetrating the cylinder wall.]

[4. The lubricating device of claim 3, characterized in that the control conduit (25), for forming the distributor device (7b), can be brought into coincidence with at least one of the outlet conduits by rotation of the piston (21).]

[5. The lubricating device of claim 1, characterized in that the piston (21) is provided with at least one control conduit on its jacket face (23).]

[6. The lubricating device of claim 5, characterized in that the control circuit (25), for forming the distributor device (7b), can be brought into coincidence with at least one of the outlet conduits by rotation of the piston (21).]

[7. The lubricating device of claim 1, characterized in that the piston (21) is rotatably supported in the cylinder (8).]

[8. The lubricating device of claim 1, characterized in that the pump device (7a) and the distributor device (7b) are connected to a drive device (33), and the drive device (33) includes a rotator device (55) and a displacement device (44), with the piston (21) connected to both the displacement device (44) and the rotator device (55).]

[9. The lubricating device of claim 8, characterized in that the rotator device (55) has a control motor which generates a desired rotary positioning motion.]

[10. The lubricating device of claim 9, characterized in that the stepping motor can be connected to the piston (21) in a manner fixed against relative rotation by means of a coupling device (39).]

[11. The lubricating device of claim 10, characterized in that the coupling device (39) has a defined rotary play.]

[12. The lubricating device of claim 8, wherein the control motor is a stepping motor.]

[13. The lubricating device of claim 1, characterized in that the locking device (46, 48) has a locking member (48), which can be brought into and out of engagement with a locking wheel (46) that is connected to the piston (21) in a manner fixed against relative rotation.]

[14. The lubricating device of claim 13, characterized in that the locking member (48) can be switched into and out of engagement with the locking wheel (46) by means of a positioning drive (51).]

[15. The lubricating device of claim 14, characterized in that the locking wheel (46) is embodied as a ratchet wheel, and the locking member (48) is embodied as a pawl.]

[16. The lubricating device of claim 1, characterized in that a control device is provided, with which the stroke of the piston (21) can be defined.]

[17. The lubricating device of claim 1, characterized in that an inlet conduit (12) leading into the cylinder (8) and outlet conduits (17) communicating with the lines (5) are each provided with one check valve.]

[18. The lubricating device of claim 1, characterized in that a sensor device (66) is provided for monitoring the motion of the piston (21).]

[19. The lubricating device for a plurality of lubricating stations, in particular for supplying lubricant to a plurality of lubricating stations in a knitting machine, having a pump device (7a) for pumping lubricant, the pump device having a piston (21) supported axially displaceably in a cylinder (8), and having a distributor device (7b), by which the lubricant pumped by the piston (21) is to be distributed to one or more lines (5) of a group (4) of lines (5) leading away from the distributor device (7b), characterized in that the distributor device (7b) is part of the pump device (7a), the pump device (7a) and the distributor device (7b) are connected to a drive device (33), and the drive device (33) includes a rotator device (55) and a displacement device (44), with the piston (21) connected to both the displacement device (44) and the rotator device (55), the displacement device (44) is actuated by the rotator device (55), and the displacement device (44) is formed by a gear, which converts a relative rotation between the piston (21) and the rotator device (55) into a linear motion of the piston (21).]

20. [The lubricating device of claim 19,] *A lubricating device for a plurality of lubricating stations, in particular for supplying lubricant to a plurality of lubricating stations in a knitting machine,*

*having a pump device for pumping lubricant, the pump device having a piston supported axially displaceably in a cylinder; and*

*having a distributor device, by which the lubricant pumped by the piston is to be distributed to one or more lines of a group of lines leading away from the distributor device, characterized in that the distributor device is part of the pump device,*

*the pump device and the distributor device are connected to a drive device, and the drive device includes a rotator device and a displacement device, with the piston connected to both the displacement device and the rotator device, the displacement device is actuated by the rotator device, and*

*the displacement device is formed by a gear, which converts a relative rotation between the piston and the rotator device into a linear motion of the piston, further* characterized in that the gear includes two threaded elements[(44, 45)], one of which is connected to the piston [(21)] in a manner fixed against relative rotation, and another of which is connected to the rotator device [(55)] in a manner fixed against relative rotation.

21. The lubricating device of claim 20, characterized in that at least one of the threaded elements [(44)] is connected to a magnet [(62)], in order to prestress the threaded elements [(44)] against one another.

[22. The lubricating device for a plurality of lubricating stations in a machine, comprising:

a combined pump and distributor unit including a piston supported to be axially displaceable and rotatable in a cylinder, said piston having a control groove adapted to eject the lubricant therethrough toward the lubricating stations due to axial displacement of the piston within the cylinder, a wall of said cylinder having a plurality of radial openings with which said control groove is sequentially alignable as said piston is rotated within the cylinder;

pump drive means for axially displacing said piston within said cylinder to eject lubricant through said control groove; and distributor drive means for rotating said piston within said cylinder into sequential alignment with said openings in the cylinder wall;

wherein said pump drive means and said distributor drive means are operable independently of each other to controllably produce axial displacement of said piston without rotation thereof, or rotation of the piston without axial displacement thereof, or both axial displacement and rotation of said piston with respect to one of said openings with which said control groove is brought into alignment.]

[23. The lubricating device of claim 22, wherein said pump drive means and said distributor drive means are components of one drive device.]

* * * * *